United States Patent [19]

Pedrazzi

[11] Patent Number: 5,006,128
[45] Date of Patent: Apr. 9, 1991

[54] SUBSTITUTED 2,4-DI[4'-(DISULFONAPHTH-2"-YLAZO)-PHENYLAMINO]-6-AMINO-1,3,5-TRIAZINES

[75] Inventor: Reinhard Pedrazzi, Allschwil, Switzerland

[73] Assignee: Sandoz Ltd., Basel, Switzerland

[21] Appl. No.: 399,665

[22] Filed: Aug. 25, 1989

[30] Foreign Application Priority Data

Aug. 26, 1988 [DE] Fed. Rep. of Germany ....... 3828909

[51] Int. Cl.⁵ ...................... C09B 33/02; C09B 43/40; D06P 1/39; C07D 251/34
[52] U.S. Cl. ............................................ 8/437; 8/681; 8/687; 8/688; 8/917; 8/918; 8/919; 8/924; 106/20; 106/22; 534/751; 534/797; 534/798; 534/799; 534/816; 534/831; 534/832; 534/839; 534/885
[58] Field of Search .................. 8/681, 687, 688, 437; 534/751, 797, 799, 832; 106/22

[56] References Cited

FOREIGN PATENT DOCUMENTS 1544425  7/1969  Fed. Rep. of Germany .
2913878 10/1980  Fed. Rep. of Germany .
36-012128 7/1961  Japan .
62-04763  1/1987  Japan .
1525280   9/1978  United Kingdom .

Primary Examiner—A. Lionel Clingman
Attorney, Agent, or Firm—Gerald D. Sharkin; Richard E. Vila; Melvyn M. Kassenoff

[57] ABSTRACT

Compounds of the formula

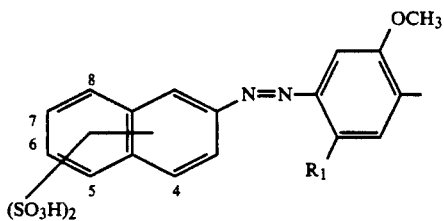

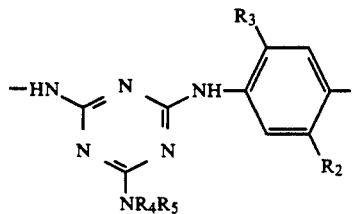

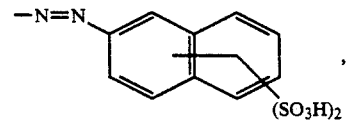

and salts thereof,
wherein
$R_1$ is hydrogen or methyl,
$R_2$ is hydrogen, methyl or acetamido,
$R_3$ is hydrogen, methyl or methoxy,
$R_4$ is hydrogen, $C_{1-4}$alkyl or hydroxy($C_{2-4}$alkyl),
$R_5$ is hydroxy($C_{2-4}$alkyl) or hydroxy($C_{2-4}$alkoxy)$C_{2-4}$alkyl, or
—$NR_4R_5$ is a 5- or 6-membered ring containing 1 to 3 hetero atoms which ring is unsubstituted or substituted by 1 to 3 substituents selected from $C_{1-4}$alkyl and $C_{2-4}$alkyl monosubstituted by hydroxy or amino, and
the two naphthyl-2 groups are identically substituted, with the proviso that when $R_3$ is methoxy, $R_1$ and $R_2$ are different, solid and aqueous liquid dye compositions and printing inks comprising such compounds and salts and the use of such compounds and salts for dyeing and printing substrates, especially hydroxy group- and nitrogen-containing organic substrates.

5 Claims, No Drawings

SUBSTITUTED 2,4-DI[4'-(DISULFONAPHTH-2''-YLAZO)-PHENYLAMINO]-6-AMINO-1,3,5-TRIAZINES

The invention relates to novel anionic disazo dyes having a triazinylamino bridge and their salts, a process for their production, their use as direct dyes in dyeing and printing processes, as well as dyeing preparations thereof.

According to the invention there is provided compounds of formula I

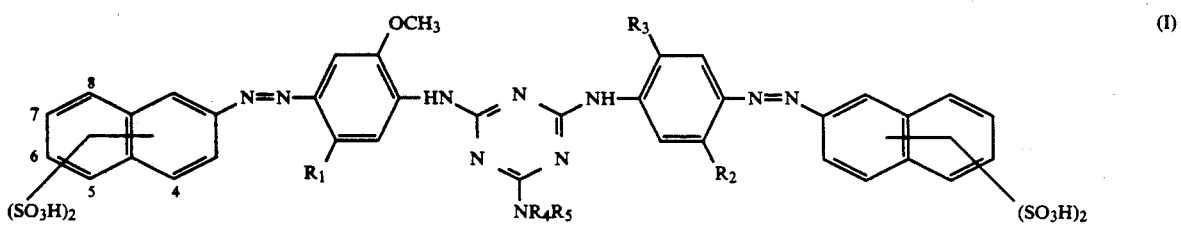

in free acid or salt form,
in which both terminal 2-naphthyl radicals are the same;
$R_1$ is hydrogen or methyl;
$R_2$ is hydrogen, methyl or acetylamino;
$R_3$ is hydrogen, methyl or methoxy;
$R_4$ is hydrogen, $C_{1-4}$ alkyl or hydroxy($C_{2-4}$alkyl); and
$R_5$ hydroxy($C_{2-4}$alkyl) or hydroxy($C_{2-4}$alkoxy)$C_{2-4}$alkyl or
$NR_4R_5$ forms a 5- or 6-membered ring containing 1 to 3 hetero atoms, which ring is unsubstituted or substituted by 1 to 3 substituents selected from $C_{1-4}$ alkyl and $C_{2-4}$ alkyl monosubstituted by hydroxy or amino;
with the proviso that $R_1$ and $R_2$ are not the same when $R_3$ is methoxy.

The compounds of formula I are new.

Preferably the terminal 2-naphthyl radicals are disubstituted in the 4,8-, 5,7- or 6,8- positions, more preferably disubstituted in the 6,8- positions.

Any group capable of being linear and branched is linear or branched unless indicated to the contrary.

Preferably $R_2$ is $R_{2a}$ which $R_{2a}$ is hydrogen or methyl.

Preferably, when $R_5$ is a hydroxy- or hydroxyalkoxy-substituted alkyl group which is bonded to a N-atom, the hydroxy or hydroxyalkoxy group is attached to a C-atom which is not adjacent to the N-atom, and preferably the hydroxy group in the hydroxyalkoxy group is attached to a C-atom which is not adjacent to an O-atom.

Suitable additional heteroatoms included in the $NR_4R_5$ heterocyclic ring are selected from N, O and S.

Preferably $R_4$ is $R_{4a}$ where $R_{4a}$ is hydrogen, $C_{1-2}$ alkyl or hydroxy($C_{2-3}$alkyl) and $R_5$ is $R_{5a}$ where $R_{5a}$ is hydroxy($C_{2-3}$alkoxy)$C_{2-3}$alkyl hydroxy ($C_{2-3}$alkoxy)$C_{2-3}$alkyl; or $NR_{4a}R_{5a}$ is a pyrrolidine, piperidine, morpholine or piperazine ring which is unsubstituted or substituted by one to three groups selected from methyl and $C_{2-3}$alkyl monosubstituted by hydroxy or amino.

More preferably $R_4$ is $R_{4b}$ where $R_{4b}$ is hydrogen, methyl or hydroxy ($C_{2-3}$ alkyl) and $R_5$ is $R_{5b}$ wherein $R_{5b}$ is hydroxy ($C_{2-3}$ alkyl); or $NR_{4b}R_{5b}$ is piperidine, morpholine, piperazine or $N(R_6)$-piperazine ring where $R_6$ is methyl, 2-hydroxyethyl or 2-aminoethyl.

Most preferably $R_4$ is $R_{4c}$ where $R_{4c}$ is hydrogen or 2-hydroxyethyl and $R_5$ is $R_{5c}$ where $R_{5c}$ is 2-hydroxyethyl.

Preferred compounds of formula I are those of formula Ia,

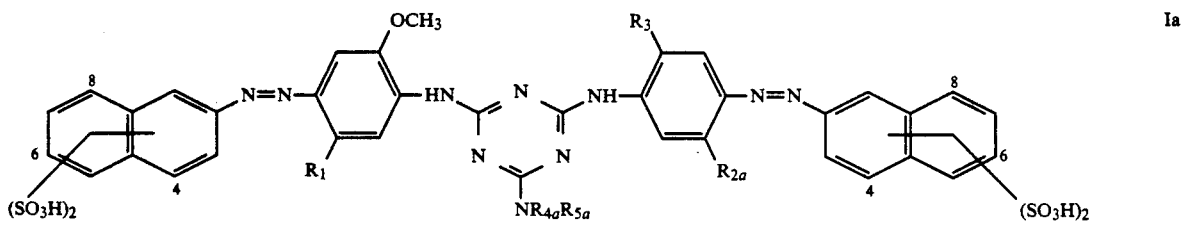

in which $R_1$, $R_{2a}$, $R_3$, $R_{4a}$ and $R_{5a}$ are as defined above; the terminal radicals are identical and are 4,8-, 5,7- or 6,8-disubstituted; with the proviso that $R_1$ and $R_{2a}$ are not the same when $R_3$ is methoxy.

Preferred compounds of formula Ia are those in which each naphthyl radical is 6,8- disubstituted and $NR_{4a}R_{5a}$ is $NR_{4b}R_{5b}$.

The compounds of formula I may exist in free acid or salt form. Such salt forms include salts of alkali metals, such as lithium, sodium or potassium, or unsubstituted or substituted ammonium salts, or mixed salts thereof. Substituted ammonium salts may be those in which the ammonium cation is derived from a primary, secondary or tertiary amine, and the following amines may be suitable for example: mono-, di- or tri-alkyl-, hydroxyalkyl-, alkoxyalkyl-, alkyl-aminoalkyl-, hydroxyalkoxyalkyl-amines or mixed amines thereof, cyclic amines such as morpholine, piperidine, piperazine or N-hydroxyalkyl substituted analogues thereof, the glycol amines and dialkyleneamines. Also suitable as amines are polyglycol amines which may be obtained for example by reacting ammonia, alkyl- or hydroxyalkylamine with alkylene oxides. The substituted ammonium ion may also be a quaternary ammonium ion which is derived from ammonium compounds which preferably contain one or two quaternary ammonium ions; examples which may be mentioned are: tetraalkyl-, hydroxyalkyl- and benzyl-ammonium hydroxide or mixtures thereof. For the avoidance of doubt, references to alkyl, alkoxy or alkylene radicals in the foregoing paragraph may be to $C_{1-4}$ alkyl, $C_{2-4}$ alkoxy and $C_{1-2}$ alkylene radicals, respectively.

A compound of formula I is produced by reacting one mole of a compound of formula II,

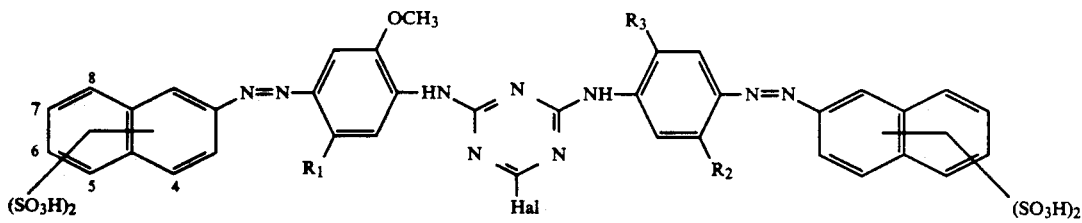

in which $R_1$, $R_2$ and $R_3$ are defined as above, and Hal is halogen, with one mole of an amine of formula III $$HNR_4R_5 \text{(III)}$$

which $R_4$ and $R_5$ are defined as above.

This condensation process can be carried out by known methods and takes place under conditions which are usual for the exchange of the third halogen atom on a triazine ring.

The compounds of formula II may be obtained by reacting cyanuric halide with the respective monoazo compound.

The condensation conditions for the exchange of the first and second halogen atoms on the triazine ring are also those normally employed.

Both the monoazo compounds used to form the compound of formula II and the amines of formula III are known compounds or may be obtained from known compounds by known methods.

A compound of formula I may be used per se in the form of the solution obtained or the solution can also be converted into a solid form by spray-drying. Furthermore, the usual methods for isolating dyes may be used, i.e. salting out from the solution, filtering off and drying.

Salt and mixed-salt forms of compounds of formula I may also be prepared by known-methods.

Compounds according to the invention in water-soluble salt form can be used for dyeing or printing hydroxy-group-containing or nitrogen-containing organic substrates. They can for example be used for dyeing or printing fibres, or filaments or textiles produced therefrom (which cannot of or contain natural or synthetic polyamides or natural or regenerated cellulose material, e.g. cotton) by known methods. For example, cotton is preferably dyed by the exhaust process, for example from a long or short bath and at a temperature from room temperature to boiling.

Printing is effected by impregnation with a printing paste which is prepared by known methods.

The new dyes can also be employed for dyeing or printing leather, preferably chrome-tanned type of leather, by known methods. In addition, the dyes may be used in the production of inks.

The compounds of formula I are especially suitable for dyeing or printing paper, e.g. for the production of mass-dyed, sized or unsized paper. They can however also be used for dyeing paper by dipping or in the sizing press. Dyeing and printing take place by known methods. The dyeings and prints obtained (especially those on paper) have good use-fastness properties.

Further according to the invention there is provided an aqueous dye preparation comprising a compound of formula I in water soluble form, optionally an inorganic salt and optionally a hydrotropic compound. The stability of the dyestuff preparation in storage due to the solubility of the dyestuff used can be further improved by adding a hydrotropic compound.

The compounds of formula I may also be used in the form of dyeing preparations. This form of application is preferred in particular when dyeing paper. The processing into stable, liquid, preferably aqueous, concentrated dyeing preparations may take place by known methods advantageously by dissolving in suitable solvents, optionally in the presence of an assistant, e.g. a hydrotropic compound or a stabiliser. Of particular advantage is the possibility of producing such stable, aqueous-concentrated preparations in the course of dyestuff synthesis itself, without intermediate isolation of the dye.

Suitable hydrotropic assistants are for example low molecular weight amides, lactones, alcohols, glycols or polyols, low molecular weight ethers or oxyalkylation products, as well as nitriles or esters. Preferred assistants are methanol, ethanol, propanol; ethylene-, propylene-, diethylene-, thiodiethylene- and dipropylene-glycol; butanediol; β-hydroxy-propionitrile, pentamethylene-glycol, ethylene-glycol-monoethyl- and -propyl-ether, ethylene-diglycol-monoethylether, triethyleneglycol-monobutylether, butyl-polyglycol, formamide, dimethylformamide, pyrrolidone, N-methylpyrrolidone, glycol acetate, butyrolactone, urea and ε-caprolactam.

Hydrotropic compounds are described e.g. by H. Rath and S. Müler, Melliand Textilberichte 40, 787 (1959) or by E. H. Daruwalla in K. Venkataraman, The Chemistry of Synthetic Dyes, Vol. VIII, pages 86–92 (1974), the contents of which are incorporated herein by reference.

One suitable composition of a liquid preparation is:
100 parts of a compound of formula I as a water-soluble salt,
1–100, preferably 1–10, parts of an inorganic salt,
100–800 parts of water,
0–500 parts of one of the above-listed hydrotropic compounds, in which all parts are by weight.

Depending on the salt form, liquid preparations may be suspensions or preferably true solutions. The preparations are stable and can be stored for a long period of time.

Still further according to the invention there is provided a solid dye preparation comprising a compound of formula I in water-soluble salt form, optionally an inorganic salt and optionally a standardizing agent. The components of formula I can be processed in known manner into solid, preferably granulated, dyeing preparations, advantageously by granulating, as described in British Patent Specification No. 1.241.053-A.

One suitable solid composition is:
100 parts of a compound of formula I as a water-soluble salt,
1–100, preferably 1–10, parts of an inorganic salt, 0-800 parts of a standardising agent (preferably a non-ionic, such as starch, dextrin, sugar, grape sugar or urea); in which all parts are by weight.

The solid preparation may contain up to 10% residual moisture.

The compounds of formula I have good solubility properties dependent on the cation or cation mixture associated with the sulpho groups, and are especially notable for their solubility in cold water. Furthermore, when producing sized or unsized paper, they hardly colour the waste water at all or only slightly. They do not mottle on paper, are substantially insensitive to filler and pH variations and have minimal inclination towards two-sided effects on paper. No loss of depth or sudden change of colour is observed either in the alkaline or in the acidic range.

The dyeings on paper have good light fastness; after long-term exposure to light, the shade alters tone-in-tone. The dyed papers have very good wet fastness properties to water, milk, fruit juices, sweetened mineral water and ionic water, and in addition have good alcohol fastness. The dyes have high substantivity, i.e. they are absorbed practically quantitatively, and thus have good build-up. They can be added to a paper pulp directly, i.e. without previously dissolving, as a dry powder or as a granulate, without any reduction in brilliance or lowering of yield of colour occurring. However, true solutions of the dyestuffs as given above are advantageously employed. They are stable, of low viscosity and can therefore be dosed well.

The dyed papers can be bleached perfectly both by oxidation and by reduction, which is important for the re-use of waste paper.

Production of the paper dyeings using the described dyes can also take place in soft water. In addition, fibrous materials containing mechanical wood pulp can be dyed in good quality.

The following examples illustrate the invention. All parts and percentages are by weight and all temperatures are given in degrees celsius, unless indicated to the contrary.

EXAMPLE 1

91 parts of 2-aminonaphthalene-6,8-disulphonic acid are dissolved in 400 parts of water and reacted with 48 parts of 30% hydrochloric acid. A solution of 21 parts of sodium nitrite in 50 parts of water is added dropwise and the temperature is maintained at 18°-20. When diazotisation has finished, any excess nitrite is broken down by the addition of 2 parts of sulphamic acid. A solution of 41 parts of 1-amino-2-methoxy-5-methylbenzene in 150 parts of water and 44 parts of 30% hydrochloric acid is added to the diazo suspension. 100 parts of 30% sodium hydroxide solution are subsequently added dropwise to give a pH of 7.5-8. After about one hour, coupling is finished and a brown dyestuff suspension is formed. The suspension is heated to 40°, and practically a solution is formed.

58 parts of cyanuric chloride are stirred well into 100 parts of water and 300 parts of ice. The above-produced dyestuff solution at 40° is added in, and the temperature during condensation is maintained at 18°-20°. At the same time a pH of 6 is maintained by the dropwise addition of 110 parts of 20% soda solution. The solution is subsequently stirred for three hours, after which the mono-condensation is complete.

131 parts of the second aminomonoazo dye, produced by the diazotisation of 2-aminonaphthalene-6,8-disulphonic acid and coupling with o-anisidine-ω-methanesulphonic acid, with subsequent saponification, are dissolved in 400 parts of water at 60°, and added dropwise to the suspension of the cyanuric chloride mono-condensate. The pH is maintained at 6.5 and heating is effected to give a constant temperature of 70°. After about 2 hours, the pH no longer changes, and the second condensation is complete.

85 parts of diethanolamine are added to this reaction mixture. The temperature is then further raised to 95°. After four hours at 95°, the third condensation is complete, 600 parts of sodium chloride are added, and the solution is stirred whilst cooling to 60°. The dyestuff precipitates into easily filterable form. It is of the formula 1a (shown in free acid form)

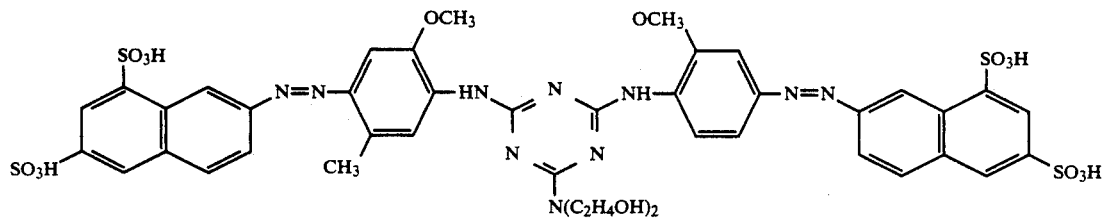

After filtering off by suction and drying at 80°, 420 parts of salt-containing dyestuff (71%) are obtained. The dyestuff dissolves well in cold water and dyes paper pulp brilliant reddish-yellow shades, whereby no loss of depth or sudden change of colour is observed either in the alkaline or in the acidic range.

The light and wet fastness of the resultant paper dyeings are good.

EXAMPLES 2-34

Further compounds of formula I may be produced analogously to the method shown in Example 1, using appropriate starting materials. The compounds produced are of formula I,

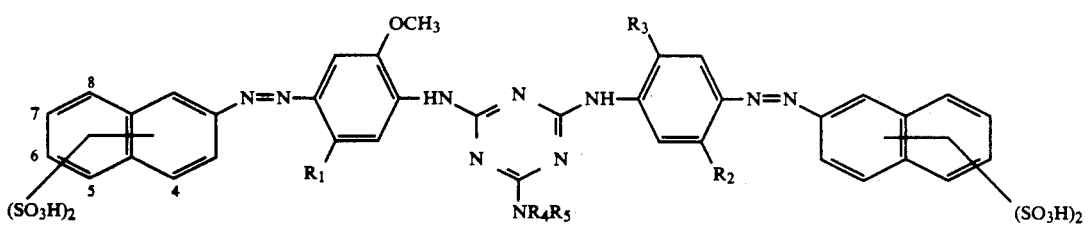

the symbols of which are listed in the following Table 1. The last column of Table I gives the shade of the paper dyeing obtained as indicated by symbol a, b or c which symbols have the following significance:
a = greenish-yellow
b = neutral yellow
c = reddish-yellow Production of the dyed papers using these dyestuffs is substantially independent of the pH range, whereby no loss of depth or sudden change of colour occur. The dyeings have good light and wet fastness.

TABLE 1

| Ex. No. | position of SO$_3$H on both naphthyl groups | R$_1$ | R$_2$ | R$_3$ | —NR$_4$R$_5$ | Shade of Dyeing |
|---|---|---|---|---|---|---|
| 2 | 6,8 | CH$_3$ | H | OCH$_3$ | —NHC$_2$H$_4$OH | c |
| 3 | " | " | H | " | —NHC$_2$H$_4$OC$_2$H$_4$OH | c |
| 4 | " | " | H | " | —N⟨piperazinyl⟩NC$_2$H$_4$OH | c |
| 5 | " | " | H | " | —N⟨morpholino⟩ | c |
| 6 | " | " | H | " | —N(CH$_3$)C$_2$H$_4$OH | c |
| 7 | " | " | H | " | —N(CH$_2$CHCH$_3$)$_2$ OH | c |
| 8 | " | " | H | " | —NHCH$_2$CHCH$_3$ OH | c |
| 9 | 5,7 | " | H | " | —N(C$_2$H$_4$OH)$_2$ | c |
| 10 | " | " | H | " | —NHC$_2$H$_4$OH | c |
| 11 | 4,8 | CH$_3$ | H | OCH$_3$ | —NHC$_2$H$_4$OH | c |
| 12 | " | " | H | " | —N(C$_2$H$_4$OH)$_2$ | c |
| 13 | 6,8 | " | H | H | " | c |
| 14 | " | " | H | H | —NHC$_2$H$_4$OH | c |
| 15 | " | " | H | H | —N⟨piperazinyl⟩N—C$_2$H$_4$OH | c |
| 16 | 5,7 | " | H | H | " | c |
| 17 | 4,8 | " | H | H | —N(C$_2$H$_4$OH)$_2$ | c |
| 18 | 6,8 | " | CH$_3$ | CH$_3$ | " | c |
| 19 | " | " | " | " | —NHC$_2$H$_4$OH | c |
| 20 | " | " | " | " | —NHC$_2$H$_4$OC$_2$H$_4$OH | c |
| 21 | 5,7 | " | " | " | —NHC$_2$H$_4$OH | c |
| 22 | 5,7 | CH$_3$ | CH$_3$ | CH$_3$ | —N(C$_2$H$_4$OH)$_2$ | c |
| 23 | 6,8 | H | H | H | " | a |
| 24 | " | H | H | H | —NHC$_2$H$_4$OH | a |
| 25 | 4,8 | H | H | H | " | a |
| 26 | " | H | H | H | —N(C$_2$H$_4$OH)$_2$ | a |
| 27 | 5,7 | H | H | H | " | a |
| 28 | " | H | H | H | —NHC$_2$H$_4$OH | a |
| 29 | 6,8 | H | CH$_3$ | CH$_3$ | " | b |
| 30 | " | H | " | " | —N(C$_2$H$_4$OH)$_2$ | b |
| 31 | " | CH$_3$ | —NHCOCH$_3$ | H | " | c |
| 32 | 5,7 | " | " | H | " | c |
| 33 | 4,8 | " | " | H | —NHC$_2$H$_4$OH | c |

TABLE 1-continued

| Ex. No. | position of SO₃H on both naphthyl groups | R₁ | R₂ | R₃ | —NR₄R₅ | Shade of Dyeing |
|---|---|---|---|---|---|---|
| 34 | " | H | " | H | " | b |

EXAMPLE 35

300 parts of the dyestuff produced according to Example 1 as a moist presscake are stirred into 1400 parts of water and this is reacted with 375 parts of urea. A solution is produced by heating to 40°. This solution is stable in storage for a long period of time, i.e. there is no precipitation either in the cold or in the heat.

EXAMPLE 36

Using the method of Example 1, but treating the reaction solution with hydrochloric acid to make it strongly acid, instead of treating it with sodium chloride following the third condensation, the dyestuff of formula 1a precipitates in free acid form. The resultant presscake is dissolved in 1000 parts of water and 500 parts of diethanolamine. A stable solution of the dyestuff of Example 1, which is ready for use, is formed in the form of the diethanolamine salt.

EXAMPLE 37

By using 100 parts of lithium monohydrate, instead of the diethanolamine in Example 36, a stable concentrated solution of the dyestuff of Example 36 as the lithium salt is similarly obtained.

In Examples 35 to 37, the dyestuff of Example 2-34 can be used in place of that of Example 1, to form the appropriate salt forms and produce liquid-aqueous dyeing preparations having high stability in storage.

Examples of suitable applications for compounds according to the invention, and their liquid-aqueous dyeing preparations, are illustrated in the following Application Examples.

APPLICATION EXAMPLE A 70 parts of chemically bleached sulphite cellulose of pinewood and 30 parts of chemically bleached sulphite cellulose of birchwood are ground in a Holländer in 2000 parts of water. 0.2 parts of the dyestuff of Example 1 are sprinkled into this mass. After mixing for 20 minutes, paper is produced therefrom. The absorbent paper thus obtained is dyes reddish-yellow. The waste water is practically colourless.

APPLICATION EXAMPLE B 0.5 parts of the dyestuff powder of Example 1 are dissolved in 100 parts of hot water and cooled to room temperature. The solution is added to 100 parts of chemically bleached sulphite cellulose, which have been ground in a Holländer in 2000 parts of water. After thorough mixing for 15 minutes, sizing takes place in the usual way with rosin size and aluminum sulphate. Paper which is produced from this material has a reddish-yellow shade and possesses good waste water and wet fastness, as well as good light fastness.

APPLICATION EXAMPLE C

An absorbent length of unsized paper is drawn through a dyestuff solution of the following composition at 40°-50°:
0.5 parts of the dyestuff of Example 1
0.5 parts of starch and
99.0 parts of water.

The excess dyestuff solution is squeezed out through two rollers. The dried length of paper is dyed reddish-yellow.

APPLICATION EXAMPLE D 50 parts of bleached sulphite cellulose of pinewood and 50 parts of bleached beech cellulose [grinding degree 30°SR*)] are mixed together with 0.5 parts of the dyestuff of Example 1 in water (pH 4, water hardness 10°dH). After 16 minutes, sheet formation takes place. The paper is dyed in an intensively reddish-yellow shade. A dyeing at pH 7 on the other hand shows no variation in depth or shade. The exhaustion rate reaches 100% and the waste water is colourless. *) °SR = Schopper Riegler degree

APPLICATION EXAMPLE E 100 parts of intermediately-dried chrome suede leather are drummed for one hour at 50° in a vat containing a bath of 400 parts of water, 2 parts of 25% ammonium hydroxide solution and 0.2 parts of a commercial wetting agent. The bath is subsequently drained, 400 parts of water at 60° and 1 part of 25% ammonium hydroxide are added to the drummed, still moist chrome suede leather. After adding 5 parts of the dyestuff of Example 1, dissolved in 200 parts of water, dyeing is effected for 90 minutes at 60°. 50 parts of 8% formic acid are then slowly added so as to render the pH acidic. Treatment then continues for a further 30 minutes. Finally, the leather is rinsed, dried and finished in the usual way. The yellow leather dyeing obtained is evenly dyed.

APPLICATION EXAMPLE F 100 parts of pre-moistened cotton fabric are added at 30° to a dyebate consisting of 3000 parts of softened water, 2 parts of soda and 1 part of the dyestuff of Example 1. After adding 10 parts of Glauber's salt, the bath is heated to boiling temperature over the course of 30 minutes, whereby during this heating process, a further 10 parts of Glauber's salt is added respectively at the temperature stage 50° and again at 70°. Dyeing then continues for a further 15 minutes at boiling temperature, and 10 parts of Glauber's salt are finally added. The dyebath is then allowed to cool. At 50°, the dyed fabric is removed from the liquor, rinsed with water and dried at 60° C. A reddish-yellow cotton dyeing with good fastness is obtained.

In place of the dyestuff of Example 1 an appropriate amount of any one of the dyestuff of Examples 2 to 34 or a liquid preparation of any one of the Examples 35 to 37 may be used in any one of Application Examples A to F.

What is claimed is:

1. The compound having the formula SO₃H

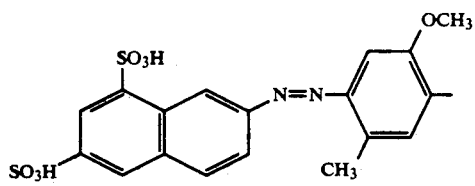

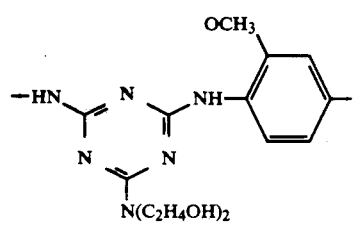

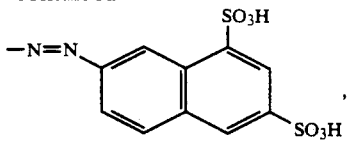

or a salt thereof.

2. A process for dyeing or printing a substrate comprising applying to a substrate the compound according to claim 1, or a salt thereof.

3. A process for dyeing or printing a substrate comprising applying to an hydroxy group- or nitrogen-containing organic substrate a water-soluble salt according to claim 1.

4. A process according to claim 3 wherein the substrate is paper, leather or a textile material comprising a natural or synthetic polyamide or natural or regenerated cellulose.

5. A printing ink comprising the compound according to claim 1, or a salt thereof.

* * * * *